US009373968B2

(12) United States Patent
Kobayashi et al.

(10) Patent No.: US 9,373,968 B2
(45) Date of Patent: Jun. 21, 2016

(54) CHARGING CONTROL DEVICE

(75) Inventors: Misayo Kobayashi, Osaka (JP);
Susumu Iida, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 191 days.

(21) Appl. No.: 13/984,992

(22) PCT Filed: Feb. 22, 2012

(86) PCT No.: PCT/JP2012/054323
§ 371 (c)(1),
(2), (4) Date: Aug. 12, 2013

(87) PCT Pub. No.: WO2012/115169
PCT Pub. Date: Aug. 30, 2012

(65) Prior Publication Data
US 2013/0320934 A1    Dec. 5, 2013

(30) Foreign Application Priority Data

Feb. 24, 2011   (JP) ................. 2011-038754
Jan. 18, 2012   (JP) ................. 2012-008392

(51) Int. Cl.
*H02J 7/00*   (2006.01)
*H01M 10/44*  (2006.01)
*B60L 11/18*  (2006.01)

(52) U.S. Cl.
CPC ........... *H02J 7/0036* (2013.01); *B60L 11/1816* (2013.01); *H01M 10/44* (2013.01); *H02J 7/0008* (2013.01); *Y02T 10/7005* (2013.01); *Y02T 10/7072* (2013.01); *Y02T 90/14* (2013.01)

(58) Field of Classification Search
CPC ........... H05B 33/0803; H05B 37/0218; Y02T 10/7077; Y02T 90/14; Y02T 10/7061; Y02T 10/7066; Y02T 10/644; Y02T 10/7011; Y02T 10/7216; Y02T 10/7241; B60L 2200/26; B60L 11/1816; B60L 11/1864
USPC .................................................. 320/160–165
See application file for complete search history.

(56) References Cited

U.S. PATENT DOCUMENTS 8,354,822 B2    1/2013 Suzuki
2006/0267552 A1*  11/2006 Baer .................... H02J 7/0054
                                                           320/128

(Continued)

FOREIGN PATENT DOCUMENTS

JP     4-93453 U      8/1992
JP     05-276676 A    10/1993

(Continued)

OTHER PUBLICATIONS

International Search Report for corresponding International Application No. PCT/JP2012/054323 mailed Jun. 5, 2012.

(Continued)

*Primary Examiner* — Binh Tat
(74) *Attorney, Agent, or Firm* — Renner, Otto, Boisselle & Sklar, LLP

(57) ABSTRACT

In a charging control device, a determining unit individually determines whether a charging path and a vehicle are in a connected state or non-connected state based on a current value detected by a current detecting means. The state of connection with the vehicle is detected not by an exclusive sensor as it is done in the prior art but by using a current detection result by the current detecting means. Hence the cost for detecting the state of connection with the vehicle can be reduced.

20 Claims, 8 Drawing Sheets

(56) References Cited

U.S. PATENT DOCUMENTS

| | | | |
|---|---|---|---|
| 2008/0042624 A1* | 2/2008 | Augesky | H02N 2/067 320/166 |
| 2010/0213896 A1* | 8/2010 | Ishii et al. | 320/109 |
| 2010/0217485 A1 | 8/2010 | Ichishi | |
| 2010/0295507 A1* | 11/2010 | Ishii | B60K 6/445 320/109 |
| 2010/0318250 A1* | 12/2010 | Mitsutani | 701/22 |
| 2011/0140659 A1 | 6/2011 | Suzuki | |

FOREIGN PATENT DOCUMENTS

| | | |
|---|---|---|
| JP | 2001-069678 A | 3/2001 |
| JP | 2010-161912 A | 7/2001 |
| JP | 2007-228695 A | 9/2007 |
| JP | 2008-278569 A | 11/2008 |
| JP | 2009-136109 A | 6/2009 |
| JP | 2010-187453 A | 8/2010 |
| JP | 2011-125178 A | 6/2011 |
| JP | 2011-130648 A | 6/2011 |

OTHER PUBLICATIONS

Form PCT/ISA/237 for corresponding International Application No. PCT/JP2012/054323 dated Jun. 5, 2012.

* cited by examiner

CHARGING CONTROL DEVICE

TECHNICAL FIELD

The present invention relates to a charging control device configured to control the charging of a storage battery equipped in such a vehicle as an electric vehicle.

BACKGROUND ART

Lately electric vehicles and plug-in hybrid vehicles equipped with a storage battery and a motor are becoming popular. In an apartment house, a sales office or the like where many such vehicles are charged simultaneously, a main breaker of a switchboard may trip when power consumption totaled with other load apparatuses exceeds a specific value. On the other hand, it is not desirable to reinforce equipment in order to prevent tripping of the main breaker due to an overloaded circuit, or to increase power under contract with a power company as power consumption increases.

According to the control performed in a prior art disclosed in Japanese Patent Application Laid-Open No. 2009-136109 (hereafter "Document 1"), a charging state of a storage battery is detected when each vehicle is connected with an external power supply, and an estimated power consumption and time of starting use are detected for each of a plurality of vehicles, and the required charging electric energy is calculated based on the detected charging state and estimated power consumption, and a charging schedule on charging time and charging electric energy of each vehicle is determined based on the required charging electric energy and time of starting use, and the storage battery mounted on each vehicle is charged based on the charging schedule.

In other words, according to the prior art disclosed in Document 1, the charging schedule on the charging time and the charging electric energy of each vehicle is determined based on the required charging electric energy and time of starting use of each vehicle, and the storage battery equipped in each vehicle is charged based on the charging schedule, therefore tripping of the main breaker due to an overloaded current can be prevented without increasing the power under contract with a power company.

In order to charge a storage battery in a vehicle, a connector of a charging cable must be connected to a charging port installed in the vehicle. Therefore according to the prior art disclosed in Document 1, a connector connection detecting unit, to detect whether the connector is connected to the charging port, is installed in the charging control device. This type of connector connection detecting unit is constituted by a proximity sensor, a micro-switch or the like that is installed in the connector, and transmits the detection result on the connector connecting state via a signal line.

However in the case of detecting whether a vehicle is connected or not using a dedicated sensor, as in the prior art, not only the sensor but also the wiring of the signal line, to transmit the result detected by the sensor, is required, which increases cost. Instead of a connector connection detecting unit, an operation input accepting unit (e.g. a touch panel with a liquid crystal monitor) to accepted operation input on the garage entering time or leaving time of a vehicle, for example, may be installed in the charging control unit. If this operation input accepting unit is installed, the cost increases even more than the connector connection detecting unit.

SUMMARY OF INVENTION

With the foregoing in view, it is an object of the present invention to reduce cost for detecting the connection state with a vehicle.

A charging control device (1) of the present invention has a current detecting means (11), a determining means (101) and a control means (100). The current detecting means (11) is configured to detect current supplied to a vehicle individually via one or a plurality of charging paths. The determining means (101) is configured to determine individually whether the charging path and the vehicle are in a connected state or a non-connected state based on a current value detected by the current detecting means (11). The control means (100) is configured to control the opening/closing of the charging path individually according to a determination result by the determining means (101). In an example, the charging control device (1) includes a plurality of current detecting means (11), and the plurality of current detecting means (11) is configured to detect a plurality of currents supplied to a plurality of vehicles via a plurality of charging paths respectively. Based on a current value detected by at least one of the plurality of current detecting means (11), the determining means (101) determines whether a charging path and a vehicle corresponding to this at least one of the current detecting means (11) is in a connected state or non-connected state. The control means (100) is configured to respectively control the opening/closing of the plurality of charging paths according to the determination result by the determining means (101).

In an embodiment, the determining means (101) is configured to periodically determine a state of the charging path determined to be in the non-connected state.

In an embodiment, the control means (100) is configured to control the opening/closing of the charging path according to the determination result by the determining means (101) and a charging schedule to charge the vehicle. The control means (100) is also configured to determine that the charging of the vehicle is ended when a current value of the charging path is below a reference value, said current value of the charging path being detected by the current detecting means (11) when the charging path to the vehicle is closed according to the charging schedule.

In an embodiment, the determining means (101) is configured to determine that the charging path and the vehicle have entered the non-connected state when the current value of the charging path detected by the current detecting means (11) becomes below the reference value while the charging path is closed.

In an embodiment, the determining means (101) is configured to determine the end of charging and the non-connected state of the vehicle according to a characteristic exhibited when the current value drops below the reference value.

In an embodiment, the determining means (101) is configured to determine that charging of the vehicle has ended when the current value of the charging path detected by the current detecting means (11) becomes below the reference value while the charging path is closed.

In an embodiment, the control means (100) is configured, according to the determination result by the determining means (101) and a charging schedule to charge the vehicle: to open the charging path when the determination result by the determining means (101) is the non-connected state; and also to close the charging path when the determination result is the connected state. The determining means (101) is configured: to periodically perform the state determination with respect to the charging path determined to be in the non-connected state when latitude from a current value detected by the current detecting means (11) to a predetermined upper limit value is a threshold or more; and also to perform the state determination when the charging path to the vehicle is opened according to the charging schedule when the latitude is below the threshold.

In an embodiment, the charging control means (1) includes a power measuring means (PM) that is configured to measure power to be consumed besides charging the vehicle. The determining means (101) is configured: to periodically perform the state determination with respect to the charging path determined to be in the non-connected state; and also to decrease the cycle of the periodic state determination when the power measured by the power measuring means (PM) exceeds a predetermined value.

In an embodiment, the control means (100) is configured to control the opening/closing of the charging path according to the determination result by the determining means (101) and the charging schedule to charge the vehicle. The determining means (101) is configured: to periodically perform the state determination with respect to the charging path determined to be in the non-connected state; and also to decrease the cycle of the periodic state determination in a time block including a garage entering time of the vehicle according to the charging schedule.

In an embodiment, the charging path is constituted by a main electric path (4) connected to a power system, and a branch electric path (5) branched from the main electric path (4), and the charging control device includes a main current detecting means (15) that is configured to detect current which flows to the main electric path (4). The determining means (101) is configured: to allow the current detecting means (11) to detect current and to determine whether the charging path and the vehicle are in a connected state or a non-connected state individually when the current value detected by the main current detecting means (15) is a predetermined upper limit value or more; and also configured not to allow the current detecting means (11) to detect the current when the current value is below the upper limit value.

In an embodiment, the control means (100) is configured to open at least one of the charging paths when the current value detected by the main current detecting means exceeds the upper limit value as a result of the closure of the charging path determined to be in the connected state by the determining means (101).

In an embodiment, the determining means (101) is configured to allow the current detecting means (11) to detect only current that flows to a charging path other than the charging path already determined to be in the connected state, when the current value detected by the main current detecting means is the upper limit value or more.

In an embodiment, the charging path is constituted by a main electric path connected to a power system and a branch electric path branched from the main electric path, and the charging control device includes a main current detecting means configured to detect current that flows to the main electric path. The determining means (101) is configured: to allow the current detecting means (11) to detect current and determine whether the charging path and the vehicle are in a connected state or non-connected state individually when the current value, detected by the main current detecting means, has changed to exceed a predetermined value; and also not to allow the current detecting means (11) to detect the current when the current value has not changed to exceed the predetermined value.

In an embodiment, the determining means (101) is configured to allow the current detecting means (11) to detect only current that flows to the charging path already determined to be in the connected state, when the change to exceed the predetermined value is generated by a decrease in the current value detected by the main current detecting means.

In an embodiment, the determining means (101) is configured to allow the current detecting means (11) to detect only current that flows to the charging path already determined to be in the non-connected state, when the change to exceed the predetermined value is generated by an increase in the current value detected by the main current detecting means.

In an embodiment, the determining means (101) is configured to allow the current detecting means (11) to detect only current that flows to the charging path already determined to be in the non-connected state, when the change to exceed the predetermined value is generated by an increase in the current value detected by the main current detecting means and the current value is the upper limit value or more.

In an embodiment, the determining means (101) is configured to allow the current detecting means (11) to detect the current that flows to the charging path, when a period, in which a change exceeding the predetermined value is not generated in the current value detected by the main current detecting means, continues for a predetermined time or more.

In an embodiment, the determining means (101) is configured to more increase the current detection cycle of the main current detecting means as a difference between the current value detected by the main current detecting means and the predetermined upper limit value becomes greater.

In an embodiment, the control means (100) is configured to close all the charging paths while the determining means (101) is determining whether the connected state or the non-connected state is established, and to open all the charging paths immediately after power recovery.

In an embodiment, the control means (100) is configured to sequentially close the charging paths after opening all the charging paths immediately after power recovery. The determining means (101) is configured to sequentially detect the current of the charging paths closed by the control means (100).

According to the charging control device of the present invention, whether the charging path and the vehicles are in a connected state or a non-connected state is individually determined based on the current value detected by the current detecting means, hence cost for detecting the connection state with the vehicle can be reduced.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS (Embodiment 1)

Figure 1:
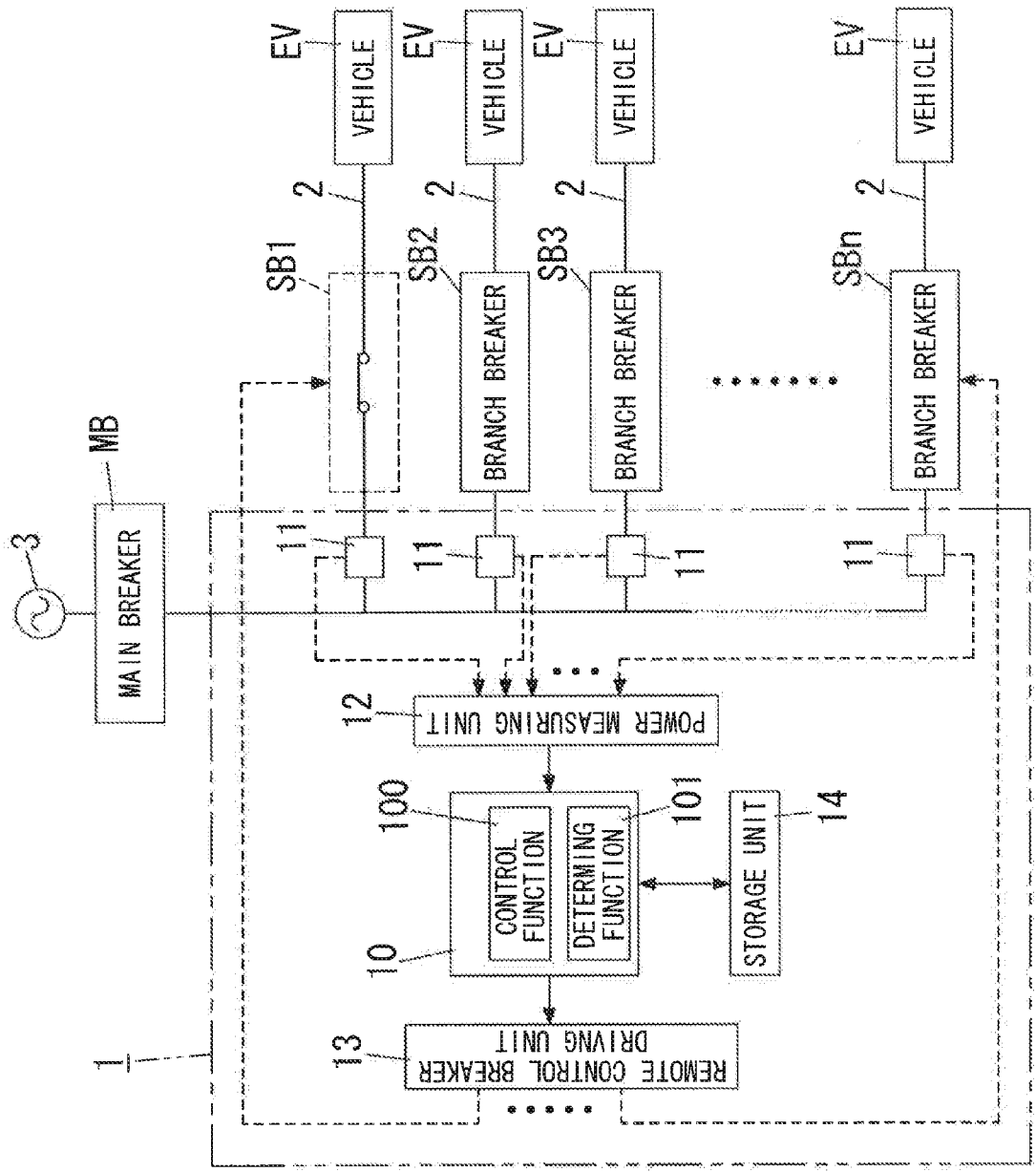
FIG. 1 is a block diagram depicting an embodiment of a charging control device according to the present invention and a system configuration of a charging system including the charging control device.

FIG. 1 shows a system configuration of a charging system including a charging control device 1 of the present embodiment. This charging system is for charging a storage battery (not illustrated) equipped in each of a plurality of vehicles (e.g. electric vehicles, plug-in hybrid vehicles and the like) EV in such a building as an apartment house and a sales office.

In the building, an electric wire (e.g. electric lamp line) to which AC power is supplied from a commercial AC power system (hereafter called "power system") 3, is connected to a primary side of a main breaker MB, and a plurality of branch breakers SBi (i=1, 2, . . . , n) are multi-point-connected to a secondary side of the main breaker MB. Each branch breaker SBi is constituted by a remote control breaker for which remote control is possible, and is configured to opens/close an electric path under control of the charging control device 1, as mentioned later, and also to open (trip) the electric path when overcurrent (short circuit current or overload current) flows. A vehicle EV is connected to each of the branch breakers SBi via a charging cable 2. Then in a state of the branch breaker SBi being closed, power (AC power) is supplied to the vehicle EV from the power system 3 via the main breaker MB, the branch breaker SBi and the charging cable 2. Instead of using the branch breakers SBi constituted by the remote control breaker, a branch breaker constituted by a regular circuit breaker, which cannot be remote controlled, and a switch, which is connected to the secondary side of the branch breaker and can be remote controlled, may be used.

The charging control device 1 includes a control unit 10, a plurality of sensor units 11, a power measuring unit 12, a remote control breaker driving unit 13, a storage unit 14 and the like. The plurality of sensor units 11 is configured to detect a plurality of currents which are supplied to a plurality of vehicles via a plurality of charging paths respectively. In the case of the example in FIG. 1, the plurality of sensor units 11 is disposed on a primary side of the plurality of branch breakers SBi, and is configured to detect current which flows to the plurality of vehicles EV via the plurality of branch breakers SBi, and voltage, and to output the detected current and voltage (current value and voltage value) to the power measuring unit 12. The power measuring unit 12 is configured to compute power (instantaneous power) and electric energy (integral electric power) from the current value and the voltage value of each branch circuit (branch breaker SBi) detected by each sensor unit 11. Each detection result (current value and voltage value) of the plurality of sensor units 11 is associated with a measurement result (electrical energy determined by computation) by a corresponding power measuring unit 12, and is stored in the storage unit 14 via the control unit 10. The storage unit 14 includes an electrically rewritable non-volatile semiconductor memory, such as a flash memory, and stores detection results by the plurality of sensor units 11, measurement results by the power measuring unit 12 corresponding to the detection results, as well as a various information set on a charging schedule and on the vehicles EV, which will be described later.

The control unit 10 is configured to turn charging each vehicle EV ON/OFF by opening/closing a charging path to each vehicle EV individually, by remote-controlling each branch breaker SBi via the remote control breaker driving unit 13 according to the charging schedule stored in the storage unit 14. The remote control breaker driving unit 13 is configured to open/close each branch breaker SBi by outputting a control signal to each branch breaker SBi responding to an instruction from the control unit 10. The control unit 10 and the power measuring unit 12 are constituted by such hardware as a CPU (Central Processing Unit) and a memory, and software (programs) to perform the processing of each unit 10 and 12.

Now the charging schedule to be stored in the storage unit 14 will be described. As described in the prior art, many vehicles EV are simultaneously charged in an apartment house, sales office and the like, so the charging current may trip exceeding a rated value of the main breaker MB. Therefore a schedule to adjust a charging time block of each vehicle EVi (charging schedule) is required in order to efficiently charge many vehicles EVi at the same time while keeping the current that flows to the main breaker MB (total of charging current to each vehicle EVi) to be less than a rated value. For example, it is assumed that 3 vehicles EV1, EV2 and EV3 are connected to the branch breakers SBi respectively, and a number of vehicles that can be simultaneously charged is 2 under the condition of keeping the current that flows to the main breaker MB to be less than a rated value. In this case, if any 2 of the vehicles (e.g. EV1 and EV2) are charged first and then the other vehicle EV3 is charged, charging of the last vehicle EV3 may not be completed by the estimated time of leaving. Therefore if a charging schedule to charge the 3 vehicles EV1, EV2 and EV3, while rotating a combination of 2 vehicles in each unit time (e.g. several tens of minutes to 1 hour or several hours), is generated, then a possibility of any vehicle EVi leaving without sufficient charging can be decreased. Such a charging schedule is generated by a schedule generating unit (not illustrated) installed in the charging control device 1 based on such information as a garage entering time and a leaving time of each vehicle EVi, which are provided in advance, and are stored in the storage unit 14. The schedule generating means may be configured separately from the charging control device 1, so that a schedule generated by the schedule generating means is stored in the storage unit 14 of the charging control device 1.

To turn the charging of each vehicle EV ON/OFF according to the charging schedule, the control unit 10 must know whether each charging path (branch breaker SBi and charging cable 2) and each vehicle EVi are connected. For this purpose, the control unit 10 includes a determining function 101 (determining means) and a control function 100 (control unit). The determining function 101 is configured, based on a current value detected by at least one of the plurality of sensor units 11: to determine whether a charging path and a vehicle, corresponding to the at least one sensor unit 11, are in a connected state or non-connected state. The control function 100 is configured to control the opening/closing of each of the plurality of charging paths according to the determination result by the determining function 101. In the case where the charging schedule is used, the control function 100 is configured to control the opening/closing of each charging path according to the determination result by the determining function 101 and the charging schedule. In the present embodiment, the control unit 10 (determining function 101) is configured: to determine that the charging path and the vehicle Evi are in a non-connected state if a current value detected by each sensor unit 11 is zero; and to determine that the charging path and the vehicle EVi are in a connected state if the current value is a reference value or more. The control unit 10 (control function 100) is configured to turn the charging ON/OFF according to the charging schedule only for a charging path (vehicle EVi) that is determined to be in the connected state.

Figure 2:
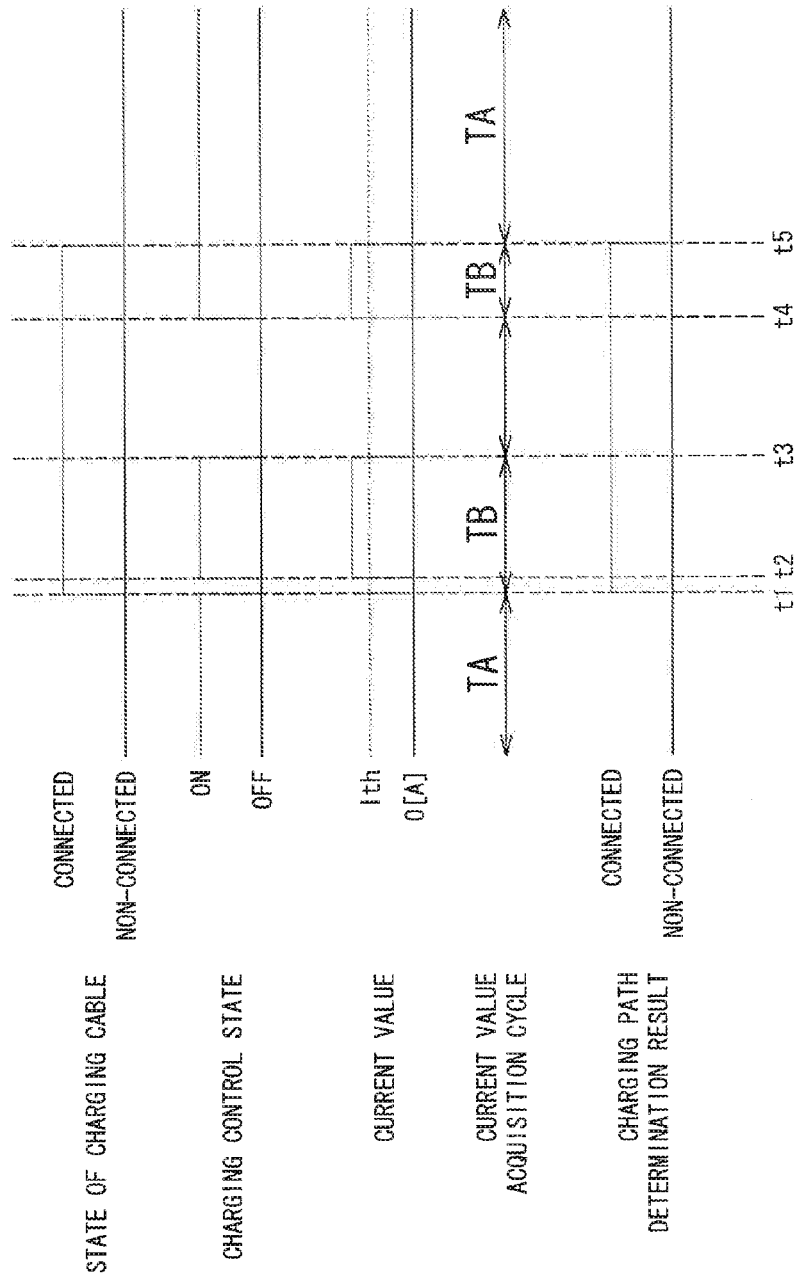
FIG. 2 is a time chart depicting an operation of this embodiment.

In order to determine the connected state/non-connected state of the charging path and the vehicle EVi based on the current value detected by the sensor unit 11, the charging state must be in the ON state (the branch breaker SBi is closed). Hereafter an operation of the charging control device 1 is described with reference to a time chart in FIG. 2, assuming that the branch breakers SBi are always closed and the sensor unit 11 is detecting current in a shortest cycle TA (e.g. 1 to several seconds cycle) while the charging path and the vehicle Evi are determined to be in the non-connected state.

It is assumed that a vehicle Evi is not connected to a charging cable 2 (charging path) until time t1, and the charging cable 2 is connected to the vehicle EVi at time t1. When the charging cable 2 is connected to the vehicle EVi at time t1, the current flows to the charging cable 2 since the branch breaker SBi is closed, and the current value detected by the sensor unit 11 exceeds a reference value Ith. The control unit 10 (determining function 101) determines that the charging cable 2 is connected to the vehicle EVi (connected state) for the branch circuit (branch breaker SBi) of which current value detected by the sensor unit 11 exceeds the reference value Ith. After determining the connection state, the control unit 10 (control function 100) temporarily turns the charging of the branch circuit OFF, which has been ON up to this point (time t1), in order to prevent tripping of the main breaker MB and to prevent exceeding the power specified under contract. If the control unit 10 (control function 100) determines to turn the charging of the branch circuit ON based on the connection states of the other branch circuits (branch breakers SBi) and the charging schedule, the control unit 10 switches charging of the branch circuit (branch breaker SBi) from OFF to ON (time t2). Further, the control unit 10 (determining function 101) changes a current detection cycle of the sensor unit 11 after time t2 to a longer cycle TB (e.g. a 10 minute cycle).

Then the control unit 10 (control function 100) switches the charging to OFF at time t3, and switches the changing again from OFF to ON at time t4, according to the charging schedule. The control unit 10 (determining function 101) stops the sensor unit 11 to detect the current from time t3 to t4, and allows the sensor unit 11 to detect the current in the cycle TB after time t4.

When the charging cable 2 is disconnected when the vehicle EVi is leaving, the control unit 10 (determining function 101) determines that the charging cable 2 is disconnected from the vehicle EVi (non-connected state) since the detected current by the sensor unit 11 becomes zero at a time lag less than the cycle TB. Then the control unit 10 (determining function 101) changes the current detection cycle by the sensor unit 11 to the shortest cycle TA while keeping this branch circuit (branch breaker SBi) closed (charging is ON).

If the charging cable 2 is disconnected while charging is OFF (period from time t3 to t4), the current value detected by the sensor unit 11 becomes below the reference value Ith (zero) at the point when the charging is switched to ON at time t4 according to the charging schedule. In other words, a considerably long time lag (e.g. several hours) could be generated from the disconnection of the charging cable 2 to the determination result of the non-connected state by the control unit 10 (determining function 101). However since this vehicle EVi is not charged during this period, execution of the charging schedule is not specially interrupted even if the non-connected state is determined at a timing when the charging is turned ON the next time.

As described above, according to the charging control device 1 of the present embodiment, the determining function 101 (determining unit) individually determines whether the charging path and the vehicle EVi are in the connected state or the non-connected state based on the current value detected by the current detecting means (sensor unit 11). In other words, instead of detecting whether the vehicle is connected or not using a dedicated sensor, as in the case of the prior art, the current detection result by the sensor unit 11 is used, hence the cost to detect the connection state with the vehicle EVi can be reduced.

Here the control function 100 (control means) determines that charging of the vehicle EVi is ended (vehicle EVi left) when the current value of the charging path, detected by the sensor unit 11 when the charging path to the vehicle Evi is closed according to the charging schedule, is below the reference value Ith Further, the control unit 10 (determining function 101) determines that the charging path and the vehicle EVi are in the non-connected state when the current value of the charging path detected by the sensor unit 11 becomes below the reference value Ith while the charging path is closed. Therefore the non-connected state (leaving of the vehicle EVi) can be detected when the charging control is performed according to the charging schedule.

(Embodiment 2)

A charging control device 1 according to the present embodiment has the same configuration as Embodiment 1, hence illustrations and description of the configuration are omitted.

Figure 3:
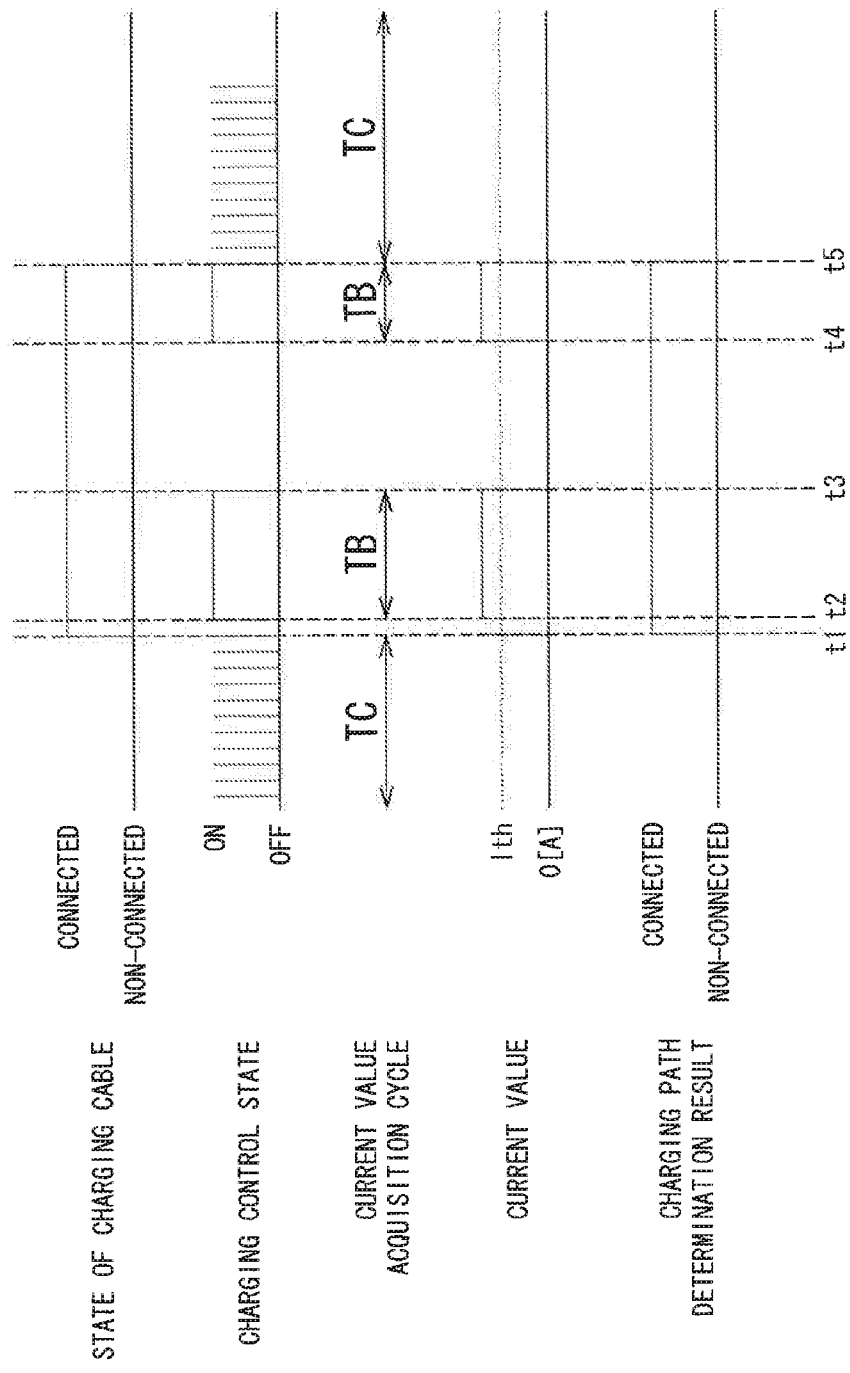
FIG. 3 is a time chart for describing an operation of Embodiment 2.

In Embodiment 1, the branch breakers SBi are normally closed, but in this embodiment the branch breakers SBi are normally opened, and when the connected state/non-connected state is determined, the branch breakers SBi are closed. Now an operation of the charging control device 1 of the present embodiment will be described with reference to a time chart in FIG. 3.

It is assumed that a vehicle Evi is not connected to a charging cable 2 (charging path) until time t1, and the charging cable 2 is connected to the vehicle EVi at time t1. While the non-connected state is determined, a control unit 10 (determining function 101) closes each branch breaker SBi with a relatively long cycle TC (e.g. 10 minute to 120 minute cycle), and compares a current value detected by a sensor unit 11 with a reference value Ith when the branch breaker SBi is closed. If the charging cable 2 is connected to the vehicle EVi at time t1, the current flows to the charging cable 2 when the branch breaker SBi is first closed (charging is ON) after time t1, and the current value detected by the sensor unit 11 exceeds the reference value Ith. For a branch circuit (branch breaker SBi) of which current value detected by the sensor unit 11 exceeded the reference value Ith, the control unit 10 (determining function 101) determines that the charging cable 2 is connected to the vehicle EVi (connected state). Further, the control unit 10 (control function 100) once opens this branch breaker SBi (charging is OFF) after the connected state is determined, in order to prevent tripping of the main breaker MB and to prevent exceeding the power specified under contract. Then if the control unit 10 (control function 100) determines to turn the charging of this branch circuit ON based on the connection state of the other branch circuits (branch breakers SBi) and the charging schedule, the control unit 10 once again switches the charging of this branch circuit (branch breaker SBi) from OFF to ON (time t2).

Just like Embodiment 1, the control unit 10 (determining function 101) changes the current detection cycle of the sensor unit 11 after time t2 to a relatively short cycle TB (e.g. 10 minute cycle). Then the control unit 10 (control function 100) switches the charging to OFF at time t3, and switches the charging again from OFF to ON at time 4 according to the charging schedule. The control unit 10 (detecting function 101) stops the sensor unit 11 to detect the current from time t3 to t4, and allows the sensor unit 11 to detect the current with the cycle TB after time t4. When the charging cable 2 is disconnected when the vehicle EVi is leaving, the control unit 10 (determining function 101) determines that the charging cable 2 is disconnected from the vehicle EVi (non-connected state) since the detected current by the sensor unit 11 becomes zero at a time lag less than the cycle TB.

Then the control unit 10 (control function 100) opens (charging is OFF) the branch circuit (branch breaker SBi), and the control unit 10 (determining function 101) changes the current detection cycle by the sensor unit 11 to cycle TC. If the charging cable 2 is disconnected while charging is OFF (period from time t3 to t4), the control unit 10 (determining function 101) can detect the non-connected state (leaving of the vehicle EVi) at a point when the control unit 10 (control function 100) switches the charging to ON at time t5 according to the charging schedule, just like Embodiment 1.

If the charging paths are normally closed, as in the case of Embodiment 1, if a plurality of vehicles EVi are simultaneously connected, current that flows to the main breaker MB may increase all at once, and the main breaker MB may be tripped. According to Embodiment 1, the current detection cycle TA by the sensor unit 11 in the non-connected state is set to a very short time, 1 to several seconds, in order to prevent tripping of the main breaker MB. Therefore the load (burden) of current detection on the sensor unit 11 becomes very high.

If the charging paths are normally open as in the case of this embodiment, on the other hand, it is less likely that current that flows to the main breaker MB would increase all at once and the main breaker MB would be tripped, even if a plurality of vehicles EVi is simultaneously connected.

(Embodiment 3)

A charging control device 1 according to the present embodiment has the same configurations as Embodiment 1, hence illustrations and description of the configuration are omitted.

The detected current by a sensor unit 11 becomes below a reference value Ith (zero) in a charging ON state, not only when a charging cable 2 is disconnected, but also when the storage battery of a vehicle EVi becomes a fully charged state. In other words, the vehicle EVi is equipped with not only the storage battery, but also with circuits to directly charge/discharge this storage battery (charging circuit and discharging circuit), and if the storage battery becomes the fully charged state, the charging circuit stops charging and no longer supplies current even if the vehicle EVi is connected with an external power supply.

Figure 4A:
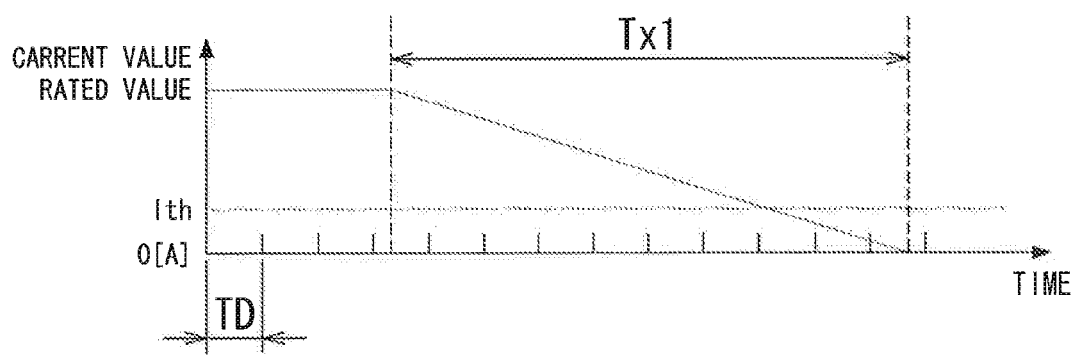
FIG. 4 is a time chart for describing an operation of Embodiment 3.
Figure 4B:
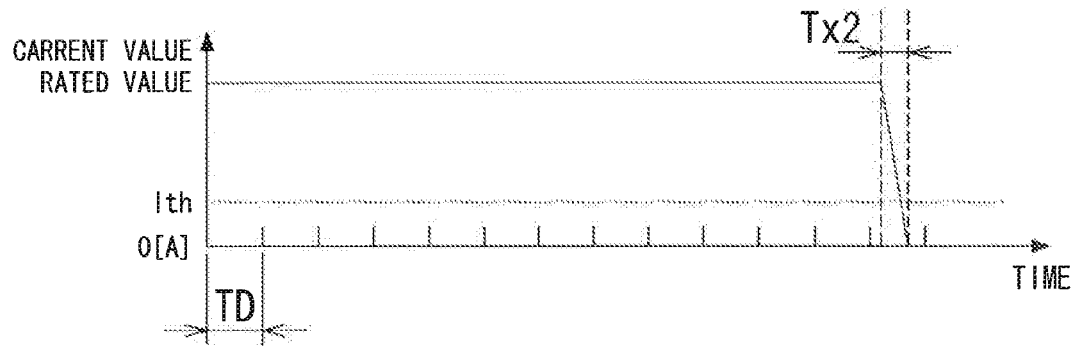

The charging circuits mounted on vehicles EVi are roughly classified into those having a characteristic to decrease the charging current relatively slowly as shown in FIG. 4A (hereafter called the "first characteristic"), and those having a characteristic to decrease the charging current rapidly as shown in FIG. 4B (hereafter called the "second characteristic"), when the charging current is stopped after reaching the fully charged state. In the case of a vehicle EVi equipped with a charging circuit having the first characteristic, the control unit 10 (determining function 101) can distinguish the fully charged state from a non-connected state by the sensor unit 11 detecting the current with a current detection cycle TD that is shorter than a period Tx1 until the charging current stops (stop transition period). In the case of a vehicle EVi equipped with a charging circuit having the second characteristic, the control unit 10 cannot distinguish the fully charged state from the non-connected state since a stop transition period Tx2 is shorter than the current detection period TD.

Therefore in the present embodiment, a vehicle EVi to be connected to each branch circuit (branch breaker SBi) is predetermined, and information indicating that the characteristic of a stop transition period Tx1 of each vehicle EVi is first or second characteristic is stored in the storage unit 14 in advance. For the charging path (branch circuit) to which a vehicle EVi having the first characteristic is connected, the control unit 10 (determining function 101) determines this state as the fully charged state, not as the non-connected state, if the current value detected during the charging ON state gradually decreases as time elapses and becomes below the reference value Ith. If the current value detected during the charging ON state rapidly decreases and becomes below the reference value Ith at this time, on the other hand, the control unit 10 (determining function 101) determines this state as the non-connected state. For the charging path (branch circuit) to which a vehicle EVi having the second characteristic is connected, the control unit 10 (determining function 101) determines this state not as the non-connected state but as the fully charged state, if the current value detected in the charging ON state is below the reference value Ith.

After the control unit 10 (control function 100) opens a branch breaker SBi of a charging circuit (branch circuit) which the control unit 10 (determining function 101) determined to be in the fully charged state, so as to turn the charging OFF, the control unit 10 (determining function 101) closes this branch breaker SBi with a relatively long current detection cycle TE (e.g. 30 minute to 6 hour cycle) to allow the sensor unit 11 to detect current. In this case, the capacity of the storage battery in the fully charged state has been slightly decreased due to self-discharge during the current detection period TD, so it is considered that the charging circuit of the vehicle EVi releases current only for a short time immediately after the branch breaker SBi is closed and charging is turned ON. Therefore if the vehicle Evi is continuously connected after reaching the fully charged state, the current value which the sensor unit 11 detects with the current detection cycle TD becomes the reference value Ith or more, which allows the control unit 10 (determining function 101) to determine that the vehicle EVi is in a connected state. If the vehicle EVi has left after reaching the fully charged state, on the other hand, the current value which the sensor unit 11 detects with the current detection cycle TD becomes below the reference value Ith, which allows the control unit 10 (determining function 101) to determine that the vehicle EVi is in a non-connected state. If the control unit 10 (determining function 101) determines that the vehicle EVi is in the connected state after determining that the vehicle EVi is in the fully charged state, the control unit 10 (control function 100) opens the branch breaker SBi of the charging path to which the vehicle EVi is connected, to turn the charging OFF. If the control unit 10 (determining function 101) determines that the vehicle EVi is in the non-connected state after determining that the vehicle EVi is in the fully charged state, the control unit 10 (control function 100) continuously closes the branch breaker SBi if the branch breaker SBi is normally closed as in the case of Embodiment 1, or opens the branch breaker SBi after control unit 10 (determining function 101) determines that the vehicle EVi is in the non-connected state if the branch breaker SBi is normally open as in the case of Embodiment 2, to turn the charging OFF.

As described above, according to the present embodiment, the fully charged state and the non-connected state of the vehicle EVi can be distinguished. Therefore burden on the control unit 10 and the sensor unit 11, due to the monitoring of the current value in a period from the vehicle EVi reaching the fully charged state to leave, can be reduced.

(Embodiment 4)

A charging control device 1 according to the present embodiment has the same configuration as Embodiment 1, hence illustrations and description of the configuration are omitted.

According to Embodiment 3, the characteristic of the charging current after full charge must be stored in the storage unit 14 in advance for each vehicle EVi, so that the control unit 10 (determining function 101) can distinguish the fully charged state from the non-connected state. Whereas according to the present embodiment, a control unit 10 (determining function 101) determines the state not as a non-connected state but as a fully charged state if a current value, detected when charging is ON, becomes below a reference value Ith in order to make it unnecessary to store (set) a charging current characteristic in a storage unit 14. Then as described in Embodiment 3, the control unit 10 (determining function 101) allows a sensor unit 11 to detect the current by closing a branch breaker SBi with a relatively long current detection cycle TE (e.g. 30 minute to 6 hour cycle), and determines that the vehicle EVi left and entered the non-connected state if the current value is below the reference value Ith. A time difference is generated between a time when the non-connected state is determined and a time when the vehicle EVi actually left, but no major problems occur in the long run.

(Embodiment 5)

A charging control device 1 according to the present embodiment has the same configuration as Embodiment 1, hence illustrations and description of the configuration are omitted.

If the branch breakers SBi are normally open, and the branch breakers SBi are closed when the connected state/non-connected state is determined, as in the case of Embodiment 2, the main breaker MB may trip by the many branch breakers SBi being closed simultaneously. For example, when the rated current of the main breaker MB is 30 amperes, and the charging current (rated value) of the vehicle EVi is 15 amperes, and when only one vehicle EVi is being charged, the latitude up to an upper limit value (30 amperes) is the charging current (15 amperes) or more, hence the state determination where the branch breaker SBi is closed can be executed for each of the other vehicles EVi in the non-connected state. On the other hand, when two vehicles EVi are being charged in the connected state, the latitude is zero, hence if the state determination where the branch breaker SBi is closed is executed for each of the third or later vehicles EVi in the non-connected state, the main breaker MB will trip.

Therefore in the present embodiment, if the latitude from a current value detected by a sensor unit 11 to a predetermined upper limit value (rated current of a main breaker MB) is a threshold (charging current of a vehicle EVi) or more, a control unit 10 (determining function 101) periodically perform the state determination (connected state/non-connected state determination) for each charging path determined to be in a non-connected state. If the latitude is less than the threshold, on the other hand, the control unit 10 (determining function 101) performs the state determination when the charging path to the vehicle EVi is opened according to a charging schedule. Thereby the main breaker MB can be prevented from tripping.

For example, in the case when the vehicle EV1 is connected only to one branch circuit (branch breaker SB1) out of four branch circuits (branch breakers SB1 to SB4) and is being charged, the latitude (15 amperes) from the detected current (15 amperes) by the sensor unit 11 for this branch circuit to the upper limit value (30 amperes) becomes the threshold (15 amperes) or more. Hence if the control unit 10 (determining function 101) sequentially opens the other three branch circuits (branch breakers SB2 to SB4) one by one, the connection state of each branch circuit (branch breakers SB2 to SB4) can be determined while preventing the main breaker MB from tripping.

In the case when the vehicles EV1 are connected to three branch circuits (branch breakers SB1, SB2, SB3) out of the four branch circuits (branch breakers SB1 to SB4), and two branch circuits (branch breakers SB1 and SB2) thereof are in a charging state, the latitude from the total of the detected current by the sensor unit 11 for each branch circuit to the upper limit value is below the threshold. In this case, the main breaker MB will trip if the branch breaker SB4 in the non-connected state is closed and the current flows. Therefore the control unit 10 (determining function 101) does not perform a periodic determination but determines the connection state of the other vehicle EV4 in a period from switching charging of one of the vehicles EV1 and EV2 to OFF to switching the charging of the other vehicle EV3 to ON, then the connection state can be determined while preventing the main breaker MB from tripping.

(Embodiment 6)

A charging control device 1 according to the present embodiment has the same configuration as Embodiment 1, hence illustrations and description of the configuration are omitted.

If the branch breakers SBi are normally open and the branch breakers SBi are closed when the connected state/non-connected state is determined, as in the case of Embodiment 2, a number of times of opening/closing the branch breakers SBi increases, and the life of the branch breakers SBi becomes relatively short compared to Embodiment 1. If the current detection cycle by the sensor unit 11 is set to be longer in order to suppress the increase in the number of times of opening/closing the branch breakers SBi, then the time lag to detect the connection state of the vehicle EVi also becomes long, and efficiency of the charging based on the charging schedule may be diminished.

Figure 5:
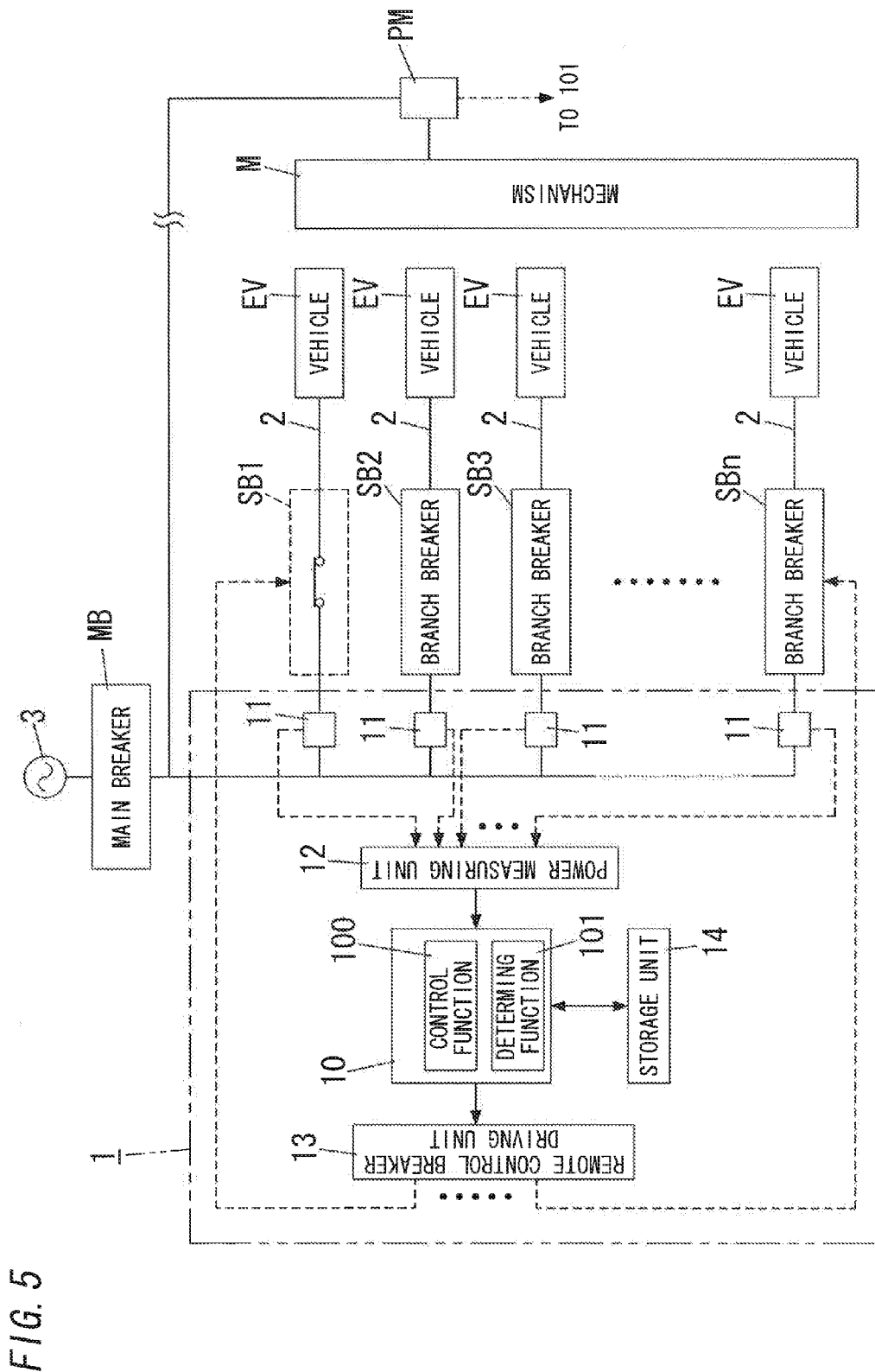
FIG. 5 is a block diagram depicting a charging control device according to Embodiment 6 and a system configuration of a charging system including the charging control device.

In an apartment house or the like, a mechanical multi-story parking lot (hereafter called a "mechanical parking lot") may be provided. In such a mechanical parking lot, power is consumed by a machine that transports a vehicle EVi when the vehicle EVi enters and leaves. This means that the timing of entering and leaving of the vehicle EVi can be estimated by monitoring the power consumption of the mechanical parking lot. However it is necessary that a power measuring unit is installed in the branch circuit to which the mechanical parking lot is connected in order to monitor the power consumption of the mechanical parking lot. In the case of a flat parking lot as well, the timing of entering and leaving of a vehicle EVi can be estimated by monitoring the power consumption of a mechanical gate installed at the entrance of the parking lot. For example, as FIG. 5 shows, a power measuring unit PM is installed in a mechanism M (e.g. mechanical parking lot or mechanical gate) that consumes power when at least one of a plurality of vehicles EVi enters or leaves, and is configured to measure the power consumption of the mechanism M and supply the measurement result to a control unit 10 (control function 100).

In this embodiment, the control unit 10 (determining function 101) periodically performs the state determination for the charging path determined to be in a non-connected state, and decreases the cycle of the periodic state determination (current detection cycle) if the power measured by the power measuring unit PM exceeds a predetermined value. In other words, when the mechanical parking lot is not operating (power is not consumed), an increase in the number of times of opening/closing branch breakers SBi can be suppressed by setting the current detection cycle relatively long, and when the mechanical parking lot is operated (power is consumed), the time lag until detecting the connection state of vehicles EVi can be decreased by setting the current detection cycle relatively short.

(Embodiment 7)

A charging control device 1 according to the present embodiment has the same configuration as Embodiment 1, hence illustrations and description of the configuration are omitted.

It is also possible that a user of a vehicle EVi reports the estimated time of entering and leaving in advance, and a schedule generating means generates a charging schedule based on the estimated time of entering and estimated time of leaving reported by the user. In this case, it is necessary to check whether the vehicle EVi actually entered or not to perform the charging control according to the charging schedule, since the vehicle EVi does not necessarily enter at the estimated time of entering.

Therefore in the present embodiment, a control unit 10 (determining function 101) periodically performs the state determination for a charging path determined to be in a non-connected state, and decreases a periodic state determination cycle (current measuring cycle) in a time block that includes the garage entering time (estimated time of garage entering) of the vehicle EVi in the charging schedule. In other words, in time blocks other than the time block that includes the estimated time of entering, a current detection cycle is set to be relatively long so that the increase in the number of times of opening/closing of branch breakers SBi can be suppressed, and in a time block that includes the estimated time of entering, the current detection cycle is set to be relatively short so that the time lag until detecting the connection state of the vehicle EVi can be decreased.

(Embodiment 8)

Figure 6:
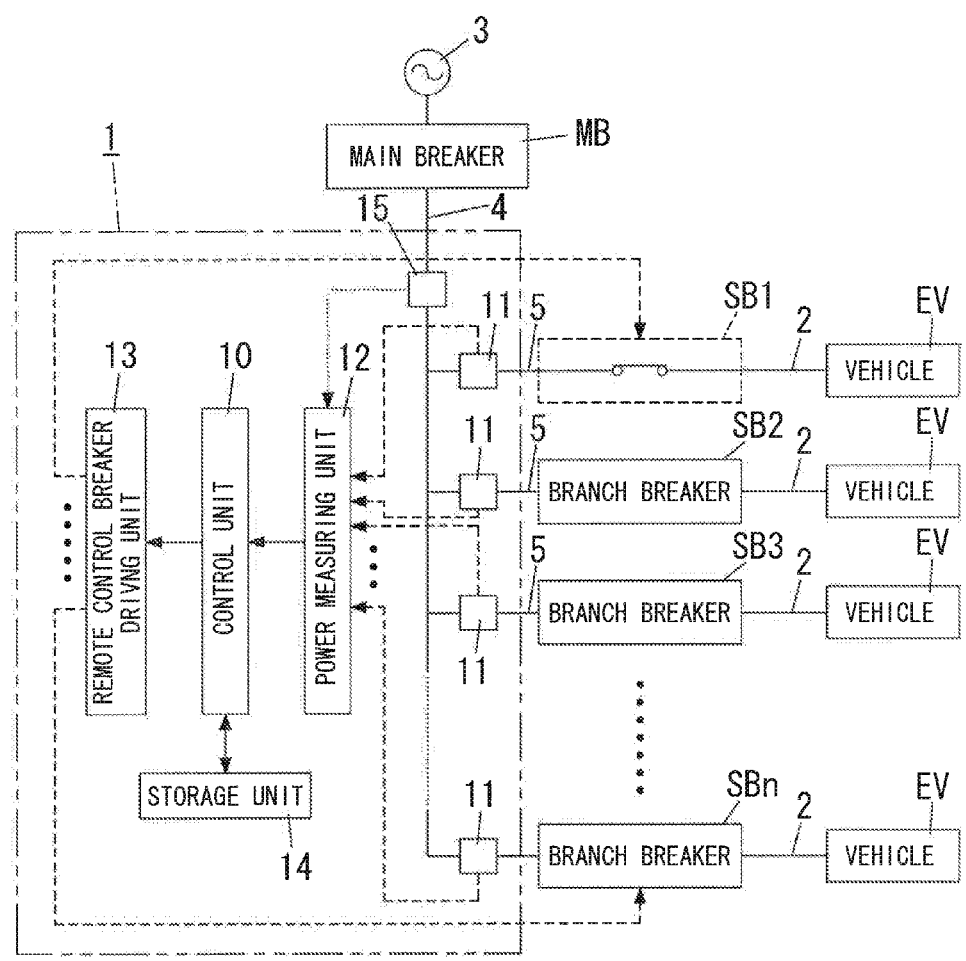
FIG. 6 is a block diagram depicting a charging control device according to Embodiment 8 and a system configuration of a charging system including the charging control device.

FIG. 6 shows a system configuration of a charging system that includes a charging control device 1 of the present embodiment. Since the basic configuration of the present embodiment is the same as Embodiment 1, common composing elements are denoted with a same reference symbol, for which description is omitted unless necessary. In the following description, an electric path connected to a secondary side of a main breaker MB is called a "main electric path 4", and an electric path that is branched from the main electric path 4 and is connected to a vehicle EV via each branch breaker SBi is called a "branch electric path 5". A charging path includes a main electric path 4, a branch electric path 5 and a charging cable 2.

When the branch breakers SBi are normally close as in the case of Embodiment 1, if the charging cables 2 are simultaneously connected to a plurality of vehicles EVi, the current that flows to the main electric path 4 increases and may cause the main breaker MB to trip. On the other hand, if the current detection cycle by each sensor unit 11 is set to be short to prevent the main breaker MB from tripping, such as setting the time shorter than the time until tripping of the main breaker MB is caused by an overloaded current (several seconds to ten and several seconds), then the processing load of the current detection on the power measuring unit 12 becomes enormous.

To prevent this problem, the charging control device 1 of this embodiment includes a sensor unit 15 for detecting current that flows to the main electric path 4 (composite current of current that flows to each branch electric path 5), in addition to the sensor unit 11 that is installed for each branch electric path 5. The sensor unit 15 is configured to detect current that flows to the main electric path 4 and voltage thereof, and to output the detected values of the current and voltage (current value and voltage value) to a power measuring unit 12. The power measuring unit 12 is configured to compute power (instantaneous power) and electric energy (integral electric energy) based on the current value and voltage value of the main electric path 4 detected by the sensor unit 15. The detection result (current value and voltage value) of the sensor unit 15 is associated with the corresponding measurement result by the power measuring unit 12 (electric energy determined based on the current value and the voltage value of the main electric path 4), and is stored in the storage unit 14 via the control unit 10. The latest result of determining the connected state/non-connected state for each charging path (branch electric path 5) is stored in the storage unit 14 by the control unit 10 (determining function 101).

Figure 7:
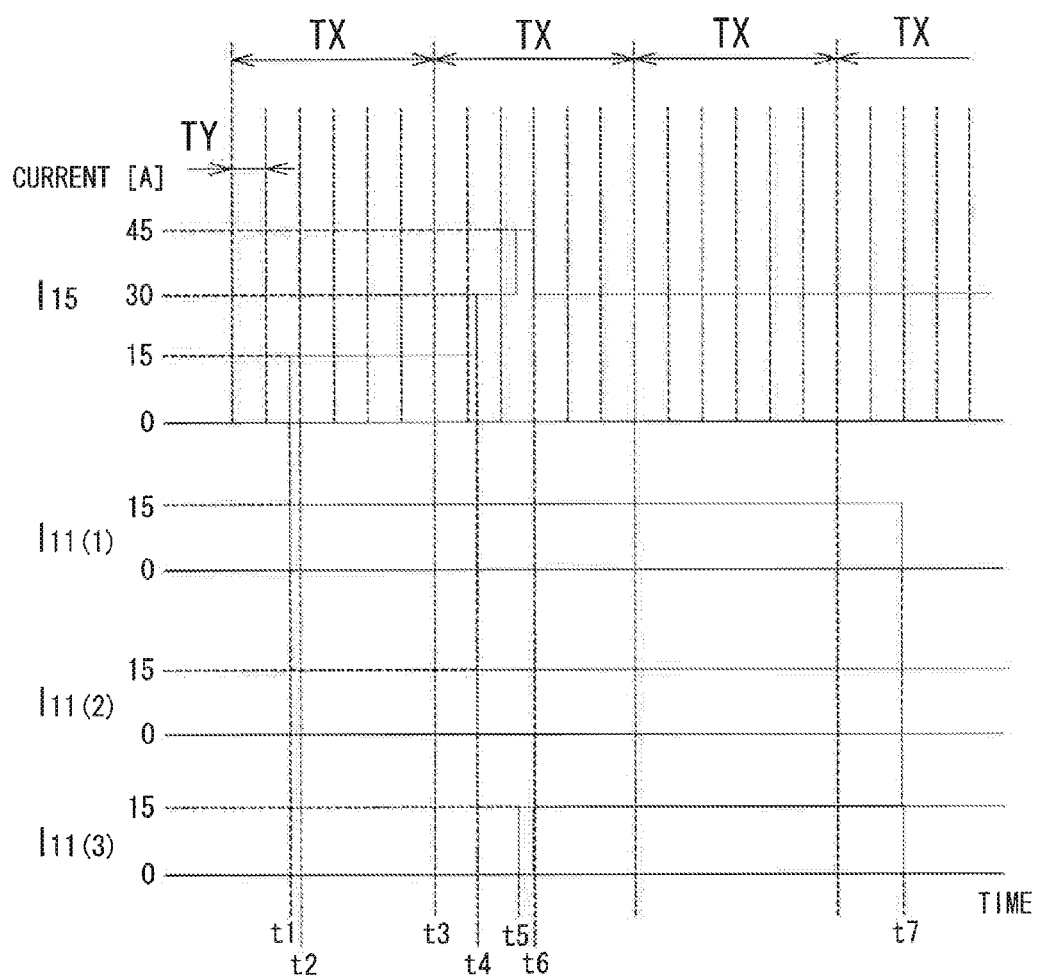
FIG. 7 is a time chart for describing an operation of Embodiment 8.

Now an operation of the charging control device 1 of the present embodiment will be described with reference to the time chart in FIG. 7 taking the case of the three branch electric paths 5, for example. In FIG. 7, $I_{15}$ denotes a current value of the main electric path 4 detected by the sensor unit 15, and $I_{11(1)}$ to $I_{11(3)}$ denote the current value of each branch electric path 5 detected by the sensor unit 11 respectively. The branch breakers SBi are normally closed just like Embodiment 1.

The power measuring unit 12 fetches, on the basis of a direction from the control unit 10 (determining function 101), the detection signals (signals that indicate a detected current value and a voltage value) outputted from each sensor unit 11 and 15. The control unit 10 (determining function 101) instructs the power measuring unit 12 to fetch the detection signals outputted from each sensor unit 11 with a relatively long cycle TX (e.g. 60 second cycle), and instructs the power measuring unit 12 to fetch the detection signals outputted from the sensor unit 15 with a relatively short cycle TY (e.g. 10 second cycle).

It is assumed that all three charging paths (branch electric paths 5) are in the non-connected state (including the fully charged state, the same applies herein after) before time t1. It is also assumed that when a vehicle EV1 is connected to one charging path (hereafter called "first charging path") at time t1, the charging of the vehicle EV1 starts, and current flows to the main electric path 4 and the branch electric path included in the first charging path (hereafter called "first branch electric path") (see $I_{11(1)}$ in FIG. 7). It is assumed that the magnitude of the current (charging current) that flows to one vehicle EVi is 15 amperes.

When the timing of the cycle TY (time t2) comes, the control unit 10 (determining function 101) instructs the power measuring unit 12 to fetch the detection signal from the sensor unit 15, and compares the current value outputted from the power measuring unit 12 (a value of current that flows to the main electric path 4) with a predetermined upper limit value. The upper limit value is set to a value equal to a rated current (e.g. 40 amperes) of the main breaker MB.

At time t2, only one vehicle EV1 is being charged, hence the current value of the main electric path 4 detected by the sensor unit 15 also becomes a value the same as the charging current for one vehicle (15 amperes) (see $I_{15}$ in FIG. 7). In other words, the control unit 10 (determining function 101) does not perform any particular processing since the current value (15 amperes) outputted from the power measuring unit 12 is below the upper limit value (40 amperes).

When a timing of the cycle TX (time t3) comes, the control unit 10 (determining function 101) instructs the power measuring unit 12 to fetch the detection signal from each sensor unit 11, and compares the current value outputted from the power measuring unit 12 (a value of current that flows to each branch electric path 5) with a reference value Ith. At time t3, the vehicle EV1 is connected only to the first charging path, hence only the current value of the first branch electric path 5 exceeds the reference value Ith, and the control unit 10 (determining function 101) determines the state of the first charging path as the connected state and updates the stored content (determination result) in the storage unit 14.

When a vehicle EV2 is connected to another charging path (hereafter "second charging path") at time t4, the charging of the vehicle EV2 starts and current flows to a branch electric path included in the second charging path (hereafter "second branch electric path") (see $I_{11(2)}$ in FIG. 7). When a vehicle EV3 is connected to the last charging path (hereafter "third charging path") at time t5, the charging of the vehicle EV3 starts and current also flows to the branch electric path included in the third charging path (hereafter "third branch electric path") (see $I_{11(3)}$ in FIG. 7).

When the timing of the cycle TY (time t6) comes after charging of the vehicles EV2 and EV3 starts, the control unit 10 (determining function 101) instructs the power measuring unit 12 to fetch the detection signal from the sensor unit 15, and compares the current value outputted from the power measuring unit 12 with the upper limit value. At time t6, the vehicles EV1, EV2 and EV3 are connected to all of the first charging path to the third charging path respectively, hence the current value that flows to the main electric path 4 becomes 45 amperes (15 amperes×3), and exceeds the upper limit value (see $I_{15}$ in FIG. 7).

Therefore the control unit 10 (determining function 101) ignores the cycle TX and immediately instructs the power measuring unit 12 to fetch the detection signal from each sensor unit 11, and determines that both the second charging path and the third charging path are in the connected state based on the output of the power measuring unit 12. Further, the control unit 10 (control function 100) opens the branch breaker SB3 of the third charging path that last changed to the connected state in order to decrease the current that flows to the main electric path 4 to be less than the upper limit value. As a result, the current flows to the first charging path and the second charging path, but no longer flows to the third charging path, and the current that flows to the main electric path 4 decreases from 45 amperes to 30 amperes (see $I_{15}$ in FIG. 7).

This means that the control unit 10 (control function 100) opens the branch breaker SB3 within a time period shorter (less than 10 seconds) than the cycle TY after the current that flows to the main electric path 4 exceeds the upper limit value, hence the current of the main electric path 4 can be decreased to below the rated current before the main breaker MB trips. It is not necessary to always open the branch breaker SBi of the charging path of which charging started last, but the branch breaker SB1 or SB2 of the charging path (first or second charging path) of which charging started first.

At time t6 or later, the control unit 10 (determining function 101) performs normal charging control for a charging path that the control unit 10 (determining function 101) has determined to be in the connected state. For example, at time t7 when a predetermined time (e.g. 60 minutes) has elapsed from the charting start time t1 of the vehicle EV1, the control unit 10 (control function 100) opens the branch breaker SB1 of the first charging path and also closes the branch breaker SB3 of the third charging path to start charging the vehicle EV3. Instead when it is determined that the vehicle EV1 or EV2 being charged is fully charged, the control unit 10 (control function 100) may close the branch breaker SB3 of the third charging path to start charging the vehicle EV3 while keep closing the branch breaker SB1 or SB2 corresponding to the vehicle EV1 or EV2 determined as fully charged.

As described above, according to the present embodiment, tripping of the main breaker MB due to overloaded current can be prevented. Furthermore, there is only one location (main electric path 4) where current is detected with a relatively short cycle, hence the processing load of current detection on the power measuring unit 12 can be decreased.

In the case when the current value detected by the sensor unit 15 is or exceeds the upper limit value, the control unit 10 (determining function 101) need not have the power measuring unit 12 detect the current values of all the charting paths (all the sensor units 11). In other words, the control unit 10 (determining function 101) has already determined the first charging path, out of the three charging paths, as the connected state, therefore it is preferable to allow the power measuring unit 12 to detect only the current values of the second charging path and the third charging path, excluding the first charging path which is in the connected state. In this way the processing load of the current detection on the power measuring unit 12 can be further decreased.

(Embodiment 9)

A charging control device 1 according to the present embodiment has the same configuration as Embodiment 8, hence illustrations and description of the configuration are omitted.

In Embodiment 8, the current detection of a main electric path 4 and the current detection of each branch electric path 5 are continuously performed always with predetermined cycles TY and TX. Whereas in the present embodiment, if a change (increase or decrease) exceeding a predetermined value occurs in a current value detected by the sensor unit 15, the control unit 10 (determining function 101) allows the power measuring unit 12 to detect the current of each sensor unit 11, and determines the connected state/non-connected state for each charging path. If a change exceeding the predetermined value does not occur in a current value detected by the sensor unit 15, on the other hand, the control unit 10 (determining function 101) does not allow the power measuring unit 12 to detect the current of each sensor unit 11.

Figure 8:
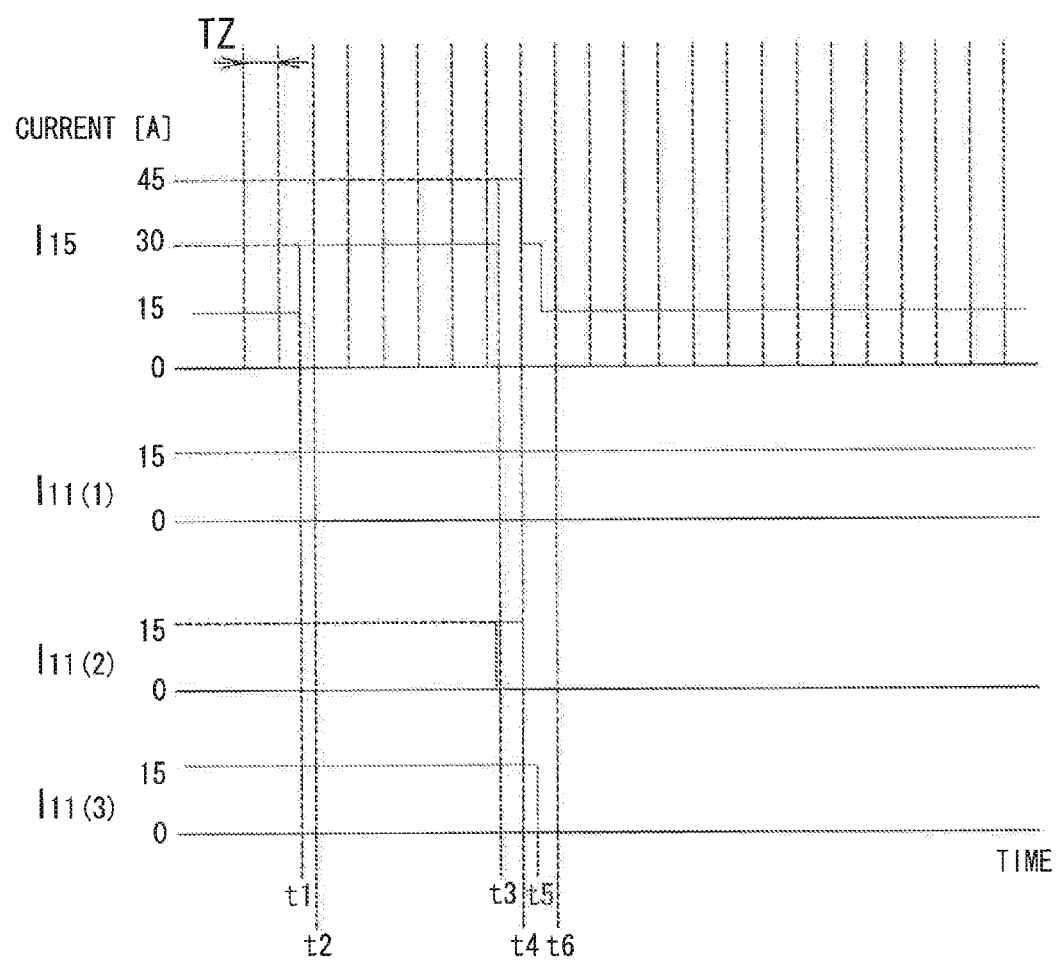
FIG. 8 is a time chart for describing an operation of Embodiment 9.

Now an operation of the charging control device 1 of the present embodiment will be described with reference to the time chart in FIG. 8, taking the case of three branch electric paths 5 for an example. In FIG. 8, $I_{15}$ denotes a current value of the main electric path 4 detected by the sensor unit 15, and $I_{11(1)}$ and $I_{11(3)}$ denote current values of each branch electric path 5 detected by the sensor unit 11 respectively. The branch breakers SBi are normally closed, just like Embodiment 8.

It is assumed that only a vehicle EV3 connected to the third charging path is being charged before time t1. When the first charging path is connected to a vehicle EV1 at time t1, the charging of the vehicle EV1 is started and the current that flows to the main electric path 4 increases. The control unit 10 (determining function 101) instructs the power measuring unit 12 to fetch the detection signals outputted from the sensor unit 15 with a relatively short cycle TZ (e.g. 10 second cycle). Therefore when the timing (time t2) of the cycle TZ comes, the control unit 10 (determining function 101) instructs the power measuring unit 12 to fetch the detection signal from the sensor unit 15, and compares a difference, between the current value outputted from the power measuring unit 12 and the previous current value stored in the storage unit 14, with a predetermined value (e.g. +/−2 amperes).

The previous current value is only the charging current (15 amperes) of the vehicle EV3, and the current value this time is the composite current (30 amperes) of the charging currents of the vehicles EV1 and EV3, hence the difference thereof is 15 amperes, which is a predetermined value (+2 amperes) or more (see $I_{15}$ in FIG. 8). Since a change (increase) exceeding the predetermined value occurred to the current value of the main electric path 4, the control unit 10 (determining function 101) instructs the power measuring unit 12 to fetch the detection signal from each sensor unit 11 of the first branch electric path 5 and the second branch electric path 5 which were determined to be in the non-connected state until the previous time (time t2). Then the control unit 10 (determining function 101) compares the current values outputted from the power measuring unit 12 (values of currents that flow to the first and second branch electric paths 5) with the reference value Ith, and determines the state of the first charging path as the connected state since the current value of the first branch electric path 5 exceeds the reference value Ith, and updates the stored content (determination result) of the storage unit 14.

When the second charging path is connected to the vehicle EV2 at time t3, the charging of the vehicle EV2 is started and the current that flows to the main electric path 4 increases. Then at the timing of the cycle TZ (time t4), the control unit 10 (determining function 101) instructs the power measuring unit 12 to fetch the detection signals from the sensor unit 15, and compares the difference, between the current value outputted from the power measuring unit 12 and the previous current value stored in the storage unit 14, with a predetermined value.

The previous current value is a composite current (30 amperes) of the charging currents of the vehicles EV1 and EV3, and the current value this time is a composite current (45 amperes) of the charging currents of the vehicles EV1, EV2 and EV3, hence the difference thereof is +15 amperes, which is a predetermined value or more (see $I_{15}$ in FIG. 8). Since a change (increase) exceeding the predetermined value occurred to the current value of the main electric path 4, the control unit 10 (determining function 101) instructs the power measuring unit 12 to fetch the detection signal from the sensor unit 11 of the second branch electric path 5, which was determined to be in the non-connected state until the previous time. Then the control unit 10 (determining function 101) compares the current value outputted from the power measuring unit 12 (value of current that flows to the second branch electric path 5) with the reference value Ith, and determines the state of the second charging path as the connected state since the current value of the second branch electric path 5 exceeds the reference value Ith. However the current value of the main electric path 4 exceeds the upper limit value (40 amperes), so the control unit 10 (control function 100) opens the branch breaker SB2 of the second charging path which changed to the connected state last, so as to make the current that flows to the main electric path 4 below the upper limit value (see $I_{11(2)}$ in FIG. 8). As a result, the current flows to the first charging path and the third charging path, and the current no longer flows to the second charging path, and the current that flows to the main electric path 4 decreases from 45 amperes to 30 amperes (see $I_{15}$ in FIG. 8).

This means that the control unit 10 (control function 100) opens the branch breaker SB2 within a time period shorter (less than 10 seconds) than the cycle TZ after the current that flows to the main electric path 4 exceeds the upper limit value, hence the current of the main electric path 4 can be decreased to below the rated current before the main breaker MB trips. It is not necessary to always open the branch breaker SBi of the charging path of which charging started last, but the branch breaker SB1 or SB3 of the charging path (first or third charging path) of which charging started first.

Then it is assumed that the vehicle EV3 is fully charged and the current value of the third branch electric path 5 becomes zero (time t5). Then at the timing of the cycle TZ (time t6), the control unit 10 (determining function 101) instructs the power measuring unit 12 to fetch the detection signals from the sensor unit 15, and compares the difference, between the current value outputted from the power measuring unit 12 and the previous current value stored in the storage unit 14, with the predetermined value.

The previous current value is a composite current (30 amperes) of the charging currents of the vehicles EV1 and EV3, and the current value this time is only the charging current (15 amperes) of the vehicle EV1, hence the difference thereof is −15 amperes, which is the predetermined value or more (see $I_{15}$ in FIG. 8). Since a change (decrease) exceeding the predetermined value occurred to the current value of the main electric path 4, the control unit 10 (determining function 101) instructs the power measuring unit 12 to fetch the detection signals from each sensor unit 11 of the first and third branch electric paths 5, which were determined to be in the connected state until the previous time. Then the control unit 10 (determining function 101) compares the current values outputted from the power measuring unit 12 (values of currents that flow to the first and third branch electric paths 5) with the reference value Ith, and determines the third charging path as the non-connected state since the current value of the third branch electric path 5 is below the reference value Ith, and updates the stored content (determination result) of the storage unit 14.

According to the present embodiment, the control unit 10 (control function 100) allows the power measuring unit 12 to detect the current of each sensor unit 11 only when a change (increase or decrease) exceeding a predetermined value occurred to the current value detected by the sensor unit 15, hence compared with Embodiment 8, the processing load of the current detection on the power measuring unit 12 can be further decreased.

Here if a same number of vehicles EVi, . . . of which charging current is the same, changed from the non-connected state to the connected state, and from the connected state to the non-connected state respectively, during the cycle TZ, a change to be at or exceed the predetermined value is not generated to the current value of the main electric path 4, which makes it impossible for the control unit 10 (determining function 101) to determine the connection state of each vehicle EVi. Therefore if a period when a change exceeding the predetermined value does not occur to the current value detected by the sensor unit 15 continues for a predetermined time (e.g. 30 minutes to 60 minutes) or longer, it is preferable that the control unit 10 (determining function 101) instructs the power measuring unit 12 to fetch the detection signal of each sensor unit 11 (detect the current of the branch electric path). Then even if a same number of vehicles EVi, . . . having the same charge current changed from the non-connected state to the connected state, and from the connected state to the non-connected state respectively during the cycle TZ, the control unit 10 (determining function 101) can determine the connected state/non-connected state for each vehicle EVi.

In this embodiment and in Embodiment 8, the current value of the main electric path 4 is normally detected with a relatively short cycle TY. However if the control unit 10 (determining function 101) more increases the current detection cycle TY by the sensor unit 15 as the difference between the current value detected by the sensor unit 15 and the upper limit value is greater, the processing load of the current detection on the power measuring unit 12 can be further decreased.

For example, it is assumed that the upper limit value is set to 75 amperes. If the difference between the current value of the main electric path 4 and the upper limit value is 60 amperes or more (the current value of the main electric path 4 is 15 amperes or less), a latitude up to the upper limit value is sufficient. Therefore the control unit 10 (determining function 101) can instruct the power measuring unit 12 to fetch the detection signals from the sensor unit 15 (detect current of the main electric path 4) with a slightly long cycle TY (e.g. 30 second cycle). If the difference between the current value of the main electric path 4 and the upper limit value is 30 to 60 amperes (current value of the main electric path 4 is 15 to 45 amperes), the control unit 10 (determining function 101) can instruct the power measuring unit 12 to fetch the detection signals from the sensor unit 15 with a slightly short cycle TY (e.g. 20 second cycle). If the difference between the current value of the main electric path 4 and the upper limit value is below 30 amperes (current value of the main electric path 4 is 45 amperes or more), the control unit 10 (determining function 101) can instruct the power measuring unit 12 to fetch the detection signals from the sensor unit 15 with a short cycle TY (e.g. 10 second cycle).

(Embodiment 10)

A charging control device 1 according to the present embodiment has the same configuration as any one of the Embodiments 1, 3, 4, 8 and 9 where the branch breakers SBi are normally closed, hence illustrations and description of the configuration are omitted.

In one of the above embodiments, if the power supplied from the power system 3 is stopped (power failure) and then restarted (recovery), a vehicle EVi, which stopped charging due to reaching the fully charged state but still remained in the connected state, may start charging temporarily. In this case, if one or a plurality of vehicles EVi, which stopped charging due to reaching the fully charged state but which still remained in the connected state, start charging all at once, the current that flows to the main electric path 4 exceeds the upper limit value much more, and the main breaker MB may immediately trip.

Therefore immediately after power recovery, it is preferable that the control unit 10 (control function 100) opens all the branch breakers SBi of the charging paths so that the current that flows to the main electric path 4 does not exceed the upper limit value very much, and tripping of the main breaker MB can be prevented. The charging control device 1 is also operated by the power supply from the power system 3, and is restarted by power recovery after stopping due to a power failure, hence the control unit 10 (control function 100) can open all the branch breakers SBi after startup.

Then after opening all the branch breakers SBi of the charging paths immediately after power recovery, the control unit 10 (determining function 101) can sequentially detect the current of each charging path while the control unit 10 (control function 100) sequentially closes the branch breakers SBi with an interval longer than the current measurement cycles TY and TZ of the main electric path 4, and determine the connected state/non-connected state for each charging path.

Although the present invention has been described with reference to certain preferred embodiments, numerous modifications and variations can be made by those skilled in the art without departing from the true spirit and scope of this invention, namely claims.

The invention claimed is:

1. A charging control device, comprising:
   a plurality of current detecting means that is configured to detect respective current supplied to a plurality of vehicles individually via a plurality of charging paths;
   a determining means that is configured to determine individually whether each charging path and a corresponding vehicle are in a connected state or non-connected state based on a current value detected by a corresponding current detecting means; and
   a control means that is configured to control opening/closing of each charging path individually according to a corresponding determination result by the determining means, wherein
   each of the plurality of charging paths comprises a breaker or a switch, for opening and closing a corresponding charging path, and
   the plurality of current detecting means are configured to be connected to the plurality of vehicles via the plurality of charging paths, respectively.

2. The charging control device according to claim 1, wherein
   the determining means is configured to periodically determine a state of the charging path determined to be in the non-connected state.

3. The charging control device according to claim 1, wherein
   the control means is configured to control opening/closing of each charging path according to a corresponding determination result by the determining means and a charging schedule to charge the plurality of vehicles, and
   the control means is also configured, when a current value of a charging path of each vehicle, detected by a corresponding current detecting means when the charging path to the vehicle is closed according to the charging schedule, is below a reference value, to determine that the charging of the vehicle is ended.

4. The charging control device according to claim 1, wherein
   the determining means is configured, when a current value of a charging path detected by each current detecting means becomes below the reference value while the charging path is closed, to determine that the charging path and a corresponding vehicle have entered the non-connected state.

5. The charging control device according to claim 4, wherein
   the determining means is configured to determine the end of charging and the non-connected state of the corresponding vehicle according to a characteristic exhibited when the current value of the charging path drops below the reference value.

6. The charging control device according to claim 1, wherein
   the determining means is configured to determine that charging of each vehicle has ended when a current value of a charging path detected by a corresponding current detecting means becomes below the reference value while the charging path is closed.

7. The charging control device according to claim 1, wherein
   the control means is configured, according to determination results by the determining means and a charging schedule to charge the plurality of vehicles: to open a charging path corresponding to a determination result by the determining means when the determination result is the non-connected state; and also to close the charging path when the determination result is the connected state, and the determining means is configured:
to periodically perform the state determination with respect to all or part, determined to be in the non-connected state, of the plurality of charging paths when latitude from a current value detected by each corresponding current detecting means to a predetermined upper limit value is a threshold or more; and also when a charging path to each vehicle is opened according to the charging schedule when the latitude is below the threshold, to perform the state determination with respect to the charging path.

8. The charging control device according to claim 1, further comprising a power measuring means that is configured to measure power to be consumed besides charging of the plurality of vehicles, wherein the determining means is configured:
to periodically perform the state determination with respect to all or part, determined to be in the non-connected state, of the plurality of charging paths; and also
to decrease a cycle of the periodic state determination when the power measured by the power measuring means exceeds a predetermined value.

9. The charging control device according to claim 1, wherein the control means is configured to control opening/closing of each charging path according to a corresponding determination result by the determining means and a charging schedule to charge the plurality of vehicles, and the determining means is configured:
to periodically perform the state determination with respect to all or part, determined to be in the non-connected state, of the plurality of charging paths; and also
to decrease a cycle of the periodic state determination in a time block including a garaging time of each vehicle according to the charging schedule.

10. The charging control device according to claim 1, wherein each charging path is constituted by a main electric path connected to a power system and a branch electric path branched from the main electric path, the charging control device comprises a main current detecting means that is configured to detect current which flows to the main electric path, and the determining means is configured:
to allow each of the plurality of current detecting means to detect current and determine whether a corresponding charging path and a corresponding vehicle are in a connected state or a non-connected state individually when the current value detected by the main current detecting means is a predetermined upper limit value or more; and also
not to allow each of the plurality of current detecting means to detect current when the current value detected by the main current detecting means is below the upper limit value.

11. The charging control device according to claim 10, wherein the control means is configured to open at least one of the plurality of charging paths when the current value detected by the main current detecting means exceeds the upper limit value as a result of closure of all or part, determined to be in the connected state by the determining means, of the plurality of charging paths.

12. The charging control device according to claim 10, wherein the determining means is configured to allow each of the plurality of current detecting means to detect only current that flows to all or part, not already determined to be in the connected state, of the plurality of charging paths, when the current value detected by the main current detecting means is the upper limit value or more.

13. The charging control device according to claim 1, wherein each charging path is constituted by a main electric path connected to a power system and a branch electric path branched from the main electric path, the charging control device comprises a main current detecting means that is configured to detect current that flows to the main electric path, and the determining means is configured:
to allow each of the plurality of current detecting means to detect current and determine whether a corresponding charging path and a corresponding vehicle are in a connected state or a non-connected state individually when the current value, detected by the main current detecting means, has changed to exceed a predetermined value; and also
not to allow each of the plurality of current detecting means to detect current when the current value, detected by the main current detecting means, has not changed to exceed the predetermined value.

14. The charging control device according to claim 13, wherein the determining means is configured to allow each of the plurality of current detecting means to detect only current that flows to all or part, already determined to be in the connected state, of the plurality of charging paths, when the change to exceed the predetermined value is generated by a decrease in the current value detected by the main current detecting means.

15. The charging control device according to claim 13, wherein the determining means is configured to allow each of the plurality of current detecting means to detect only current that flows to all or part, already determined to be in the non-connected state, of the plurality of charging paths, when the change to exceed the predetermined value is generated by an increase in the current value detected by the main current detecting means.

16. The charging control device according to claim 13, wherein the determining means is configured to allow each of the plurality of current detecting means to detect only current that flows to all or part, already determined to be in the non-connected state, of the plurality of charging paths, when the change to exceed the predetermined value is generated by an increase in the current value detected by the main current detecting means and a current value detected by a corresponding current detecting means is an upper limit value or more.

17. The charging control device according to claim 13, wherein the determining means is configured to allow each of the plurality of the current detecting means to detect current that flows to a corresponding charging path, when a period, in which a change to exceed the predetermined value is not generated in the current value detected by the main current detecting means, continues for a predetermined time or more.

18. The charging control device according to claim 10, wherein
the determining means is configured to more increase a current detection cycle of the main current detecting means as a difference between the current value detected by the main current detecting means and the predetermined upper limit value becomes greater.

19. The charging control device according to claim 1, wherein
the control means is configured to close all the plurality of charging paths while the determining means is determining whether the connected state or the non-connected state is established, and to open all the plurality of charging paths immediately after power recovery.

20. The charging control device according to claim 19, wherein
the control means is configured to sequentially close the plurality of charging paths after opening all the plurality of charging paths immediately after power recovery, and
the determining means is configured to sequentially detect current of each charging path which is closed by the control means.

* * * * *